(12) United States Patent
Cheng et al.

(10) Patent No.: US 10,872,415 B2
(45) Date of Patent: Dec. 22, 2020

(54) LEARNING-BASED SPINE VERTEBRA LOCALIZATION AND SEGMENTATION IN 3D CT

(71) Applicant: Broncus Medical Inc., San Jose, CA (US)

(72) Inventors: Erkang Cheng, San Jose, CA (US); Lav Rai, Sunnyvale, CA (US); Henky Wibowo, Cupertino, CA (US)

(73) Assignee: Broncus Medical Inc., San Jose, CA (US)

( * ) Notice: Subject to any disclaimer, the term of this patent is extended or adjusted under 35 U.S.C. 154(b) by 75 days.

(21) Appl. No.: 15/763,797

(22) PCT Filed: Oct. 25, 2016

(86) PCT No.: PCT/US2016/058574
§ 371 (c)(1),
(2) Date: Mar. 27, 2018

(87) PCT Pub. No.: WO2017/074890
PCT Pub. Date: May 4, 2017

(65) Prior Publication Data
US 2018/0286050 A1    Oct. 4, 2018

Related U.S. Application Data

(60) Provisional application No. 62/248,226, filed on Oct. 29, 2015.

(51) Int. Cl.
*G06T 7/11* (2017.01)
*G06T 7/162* (2017.01)
*G06T 7/143* (2017.01)

(52) U.S. Cl.
CPC ............... *G06T 7/11* (2017.01); *G06T 7/143* (2017.01); *G06T 7/162* (2017.01);
(Continued)

(58) Field of Classification Search
CPC . G06T 7/11; G06T 7/143; G06T 2207/10081; G06T 2207/30012;
(Continued)

(56) References Cited

U.S. PATENT DOCUMENTS

2002/0136437 A1* 9/2002 Gerard ...................... G06T 7/60
382/128
2006/0251302 A1 11/2006 Abufadel et al.
(Continued)

OTHER PUBLICATIONS

Law, Max WK, et al. "Gradient competition anisotropy for centerline extraction and segmentation of spinal cords." International Conference on Information Processing in Medical Imaging. Springer, Berlin, Heidelberg, 2013. (Year: 2013).*
(Continued)

*Primary Examiner* — Amandeep Saini
(74) *Attorney, Agent, or Firm* — Richard Batt

(57) ABSTRACT

Described herein is a novel method and system for segmentation of the spine using 3D volumetric data. In embodiments, a method includes an extracting step, localization step, and segmentation step. The extracting step comprises detecting the spine centerline and the spine canal centerline. The localization step comprises localizing the vertebra and intervertebral disc centers. Background and foreground constraints are created for each vertebra digit. Segmentation is performed for each vertebra digit and based on the hard constraints.

17 Claims, 6 Drawing Sheets

(52) U.S. Cl.
CPC ............... *G06T 2207/10081* (2013.01); *G06T 2207/20076* (2013.01); *G06T 2207/20081* (2013.01); *G06T 2207/30012* (2013.01); *G06T 2207/30172* (2013.01)

(58) Field of Classification Search
CPC . G06T 2207/20076; G06T 2207/20081; G06T 7/162; G06T 2207/30172
USPC ........................................................ 382/131
See application file for complete search history.

(56) References Cited

U.S. PATENT DOCUMENTS

| | | | |
|---|---|---|---|
| 2008/0044074 A1 | 2/2008 | Jerebko et al. | |
| 2008/0273777 A1* | 11/2008 | Luboz | G06T 17/20 382/130 |
| 2008/0317322 A1 | 12/2008 | Acharyya et al. | |
| 2009/0232378 A1* | 9/2009 | Nakamura | G06T 7/337 382/131 |
| 2011/0058720 A1 | 3/2011 | Lu et al. | |
| 2012/0143090 A1* | 6/2012 | Hay | A61B 6/505 600/587 |
| 2013/0077840 A1 | 3/2013 | Blumfield et al. | |
| 2013/0136322 A1* | 5/2013 | Zhan | G06T 7/73 382/128 |
| 2014/0254907 A1* | 9/2014 | Wang | G06T 7/143 382/131 |
| 2015/0043799 A1 | 2/2015 | Zhan et al. | |

OTHER PUBLICATIONS

PCT International Search Report dated Feb. 27, 2017, for PCT/US2016/058574.
"Vertebrae Localization in Pathological Spin CT via Dense Classification from Sparse Annotations," B.Glocker et al., Microsoft Research, Cambridge, UK, Martinos Center for Biomedical Imaging MGH, Harvard Medical School, MA USA, University of Washington, Seattle, WA USA, http://research.microsoft.com/projects/medicalimageanalysis/.
"Spine detection in CT and MR using iterated marginal space learning," B.M. Kelm, et al., Medical Image Analysis, www.elseview.com/locate/media, No. 17 (2013).
"Interactive Graph Cuts for Optimal Boundary & Region Segmentation of Objects in N-D Images," Y.Y. Boykov and M-P Jolly, Siemens Corporate Research, Princeton, NJ, Proceedings on International Conference on Computer Vision, Vancouver, CA, Jul. 2001.
"Vertebral body segmentation with prior shape constraints for accurate BMD measurements." A.M. Ali, et al., Computerized Medical Imaging and Graphics, www.elsevier.com/locate/compmedimag, 2014.
"3D Vertebrae Segmentation Using Graph Cuts With Shape Prior Constraints," M.S. Asian et al., Proceedings of 2010 IEEE 17th International Conference on Image Processing, Hong Kong, Sep. 26-29, 2010.
"Hierarchical Segmentation and Identification of Thoracic Vertebra Using Learning-Based Edge Detection and Corse-to-Fine Deformable Model," J.Ma et al., CAD & Knowledge Solutions, Siemens Healthcare, Malvern, PA, Center for Imaging Science, Johns Hopkins University, Baltimore, MD, MICCAI 2010.
"Lumbar Spine Segmentation Using a Statistical Multi-Vertebrae Anatomical Shape+Pose Model," A.Rasoulian et al., IEEE Transactions on Medical Imaging, vol. 32, No. 10, Oct. 2013.
"Automatic and Reliable Segmentation of Spinal Canals in Low-Resolution Low-Contrast CT Images," Q.Wang et al., Computational Methods and Clinical Applications for Spine Imaging, Lecture Notes in Computational Vision and Biomechanics 17, DOI:10.1007/978-3-319-07269-2_2, Springer International Publishing, Switzerland, 2014.
"Implementing Discrete Mathematics: Combinatorics and Graph Theory with Mathematica," S.Skiena, Department of Computer Science, State University of New York, Stony Brook, NY, Addison-Wesley, Reading, MA, 1990.
"Mean Shift, Mode Seeking, and Clustering," Y.Cheng, IEEE Transactions on Pattern Analysis and Machine Intelligence, vol. 17, No. 8, Aug. 1995.
"Shape Modeling with Front Propagation: a Level Set Approach," R.Malladi et al., Department of Computer and Information Sciences, University of Florida, Gainsville, FL and Department of Mathematics, University of California, Berkeley, CA, submitted for publication in IEEE Transactions on Pattern Analysis and Machine Intelligence.
"A Decision-Theoretic Generalization of On-Line Learning and an Application to Boosting," Y.Freund et al., AT&T Labs, Florham Park, NJ, USA, Journal of Computer and System Sciences 55, Article No. SS971504, 1997.
"Additive Logistic Regression: a Statistical View of Boosting," J.Friedrnan et al., Stanford University, Aug. 1998.
"Regression Forests for Efficient Anatomy Detection and Localization in CT Studies," A.Criminisi et al., Microsoft Research Ltd., Cambridge, UK, MICCAI 2010 Workshop MCV, LNCS 6533, 2011.

* cited by examiner

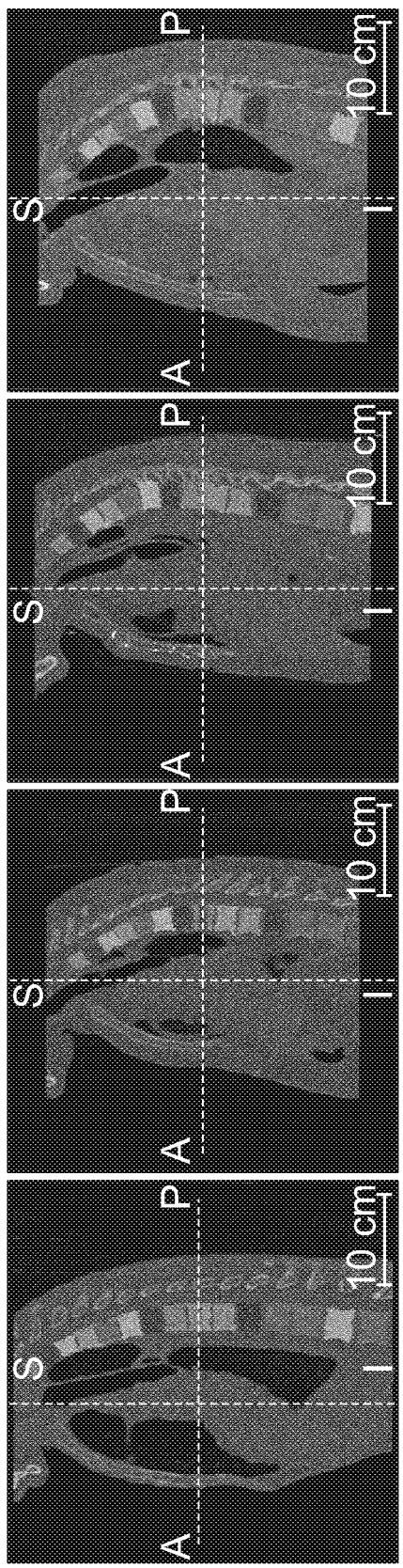
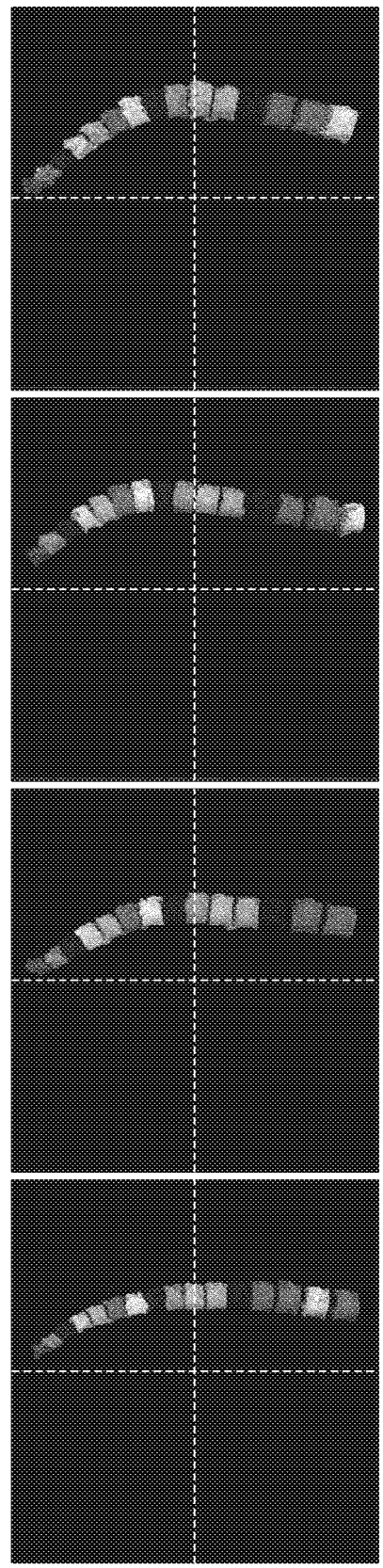

LEARNING-BASED SPINE VERTEBRA LOCALIZATION AND SEGMENTATION IN 3D CT

CROSS-REFERENCE TO RELATED APPLICATIONS

The present application is a 35 U.S.C. § 371 patent application of international patent application no. PCT/US16/58574, filed Oct. 25, 2016, entitled "LEARNING-BASED SPINE VERTEBRA LOCALIZATION AND SEGMENTATION IN 3D CT IMAGE" and claims the benefit of provisional patent application No. 62/248,226, filed Oct. 29, 2015, entitled "LEARNING-BASED SPINE VERTEBRA LOCALIZATION AND SEGMENTATION IN 3D CT IMAGE".

BACKGROUND OF THE INVENTION

Spine segmentation is important for spinal screening and examination in the assistance of pathological progression evaluation and therapies. The task is often challenging due to large variations in vertebra appearance and profiles, as well as image noise.

A number of approaches have been reported to address spine localization and segmentation. For example, in Glocker et al. [Reference 1], given sparse annotation of vertebra center, vertebra localization is achieved by random forest and mean shift clustering. Kelm et al. [Reference 2] also describes an iterative marginal spacing learning algorithm for spine detection. Boykov et al. [Reference 3] describes a graph-cut method for spine segmentation.

Kelm et al. [Reference 2] and Asem et al. [Reference 4] describe a graph-cut method combined with shape information for spine segmentation.

Aslan et al. [Reference 5] describes shape prior constraints fused into a graph-cut framework. Asem et al. [Reference 4] also describes a graph-cut method to incorporate both appearance models and shape constraints approaches.

Shape statistic analysis has also been applied in spine segmentation. In Ma and Lu [Reference 6], a shape deformable model is studied with learning based boundary detection. A registration-based method is applied with statistical multi-vertebrae anatomical shape with a pose model in Rasoulian et al. [Reference 7]. Additionally, spine canal segmentation is conducted by random walk algorithm in Wang et al. [Reference 8].

The above described references have a number of drawbacks some of which include not efficiently detecting anatomical features, searching too large a search space, requiring complicated false positive removal strategies, or requiring extensive manual annotation to build the shape information.

Accordingly, there exists a need for a method and system to segment the spine in 3D CT with increased speed and accuracy.

SUMMARY OF THE INVENTION

A method and system performs spine segmentation in 3D CT data.

In embodiments, a method comprises performing a spine vertebra localization and spine segmentation. The spine centerline and the spine canal centerline are extracted, and the vertebra and intervertebral disc centers are localized.

In embodiments, the vertebra and intervertebral disc centers are detected by probabilistic interference framework and based on one or more constraints including, for example, requiring the vertebra and intervertebral disc centers to be located on the spine centerline.

The step of spine segmentation is performed for each vertebra digit. The method constructs foreground and background constraints for the segmentation framework based on the spine vertebra localization results.

In embodiments, a system comprises a computer having a processor operable to perform the following steps: extract the spine centerline and spine canal centerline; localize the vertebra center and intervertebral disc centers; and construct case-specific foreground and background constraints for each vertebra digit.

In a particular embodiment, a system for segmenting an anatomical structure of a patient, the system comprises: a memory unit for storing 3D image data of the patient; and a programmed processor. The programmed processor is operable to: detect a characteristic feature of the anatomical structure and compute an augmented constrained region encompassing the anatomical structure, and wherein the detecting is based on a prediction map; segment the anatomical structure based on the detected characteristic feature and augmented constrained region; and a display in communication with the processor and for showing the anatomical structure. In embodiments the characteristic feature is a centerline.

In embodiments, the processor is operable to localize a vertebra center and an intervertebral disc center based on the augmented constrained region. The augmented constrained region can be a tube-like region encompassing the spine centerline and canal centerline.

In embodiments, the processor is operable to construct hard constraints for a spine digit based on the vertebra center and the disc center.

In embodiments, the processor is operable to segment a spine digit based on the hard constraints.

In embodiments, the processor is operable to localize based on a probabilistic inference algorithm.

In embodiments, the processor is operable to detect the spine centerline based on machine learning.

In embodiments, a method for identifying an anatomic structure of a patient comprises localizing a characteristic feature of the anatomic structure from a 3D image data set of the patient; automatically segmenting the anatomic structure based on the above localizing step; and identifying the anatomic structure.

In embodiments, the characteristic feature is a center of the anatomic structure. The method may further comprise detecting a centerline of the anatomic structure from the 3D image data set of the patient. In embodiments, the detecting the centerline is performed automatically and without manual input. In embodiments, the center is required to be on the centerline.

In embodiments, the invention comprises computing an augmented constrained region encompassing the anatomic structure.

In embodiments, the computing step is based on a bounding box algorithm or localization.

In embodiments, the step of localizing may be based on a machine learning algorithm.

In embodiments, the localization is estimated by probabilistic inference.

In embodiments, the anatomic structure is a spine or a rib.

In embodiments, the anatomic structure is rigid or non-rigid.

In embodiments, the anatomic structure is a plurality of interconnected components. Examples of interconnected components include, for example, the digits of the spine such as L1, L2, . . . C1, C2, . . . or in embodiments the ribs.

In embodiments, the centerline is the rib centerline. The centerline may be detected based on machine leaning.

In embodiments, the identifying is performed by a computer and based on an annotated exemplary anatomical structure.

In embodiments, input is CT data, and preferably 3D CT image data.

In embodiments, the output spine segmentation is sent to a display.

In embodiments, a method for identifying an anatomic structure of a patient comprises computing a constrained region encompassing the anatomic structure from a 3D image data set of the patient; automatically segmenting the anatomic structure based on the above computing step; and identifying the anatomic structure.

In embodiments, the computing step is based on a bounding box algorithm.

In embodiments, the computing step is based on detecting a centerline of the anatomic structure from the 3D image data set of the patient.

In embodiments, the centerline is a spine centerline, and the detecting also comprises detecting the spinal canal of the patient.

In embodiments, the computing step comprises computing a cylindrical shaped constrained region that encompasses the spinal canal and spine centerline.

In embodiments, the method further comprises localizing a disc center and vertebra center based on the computing step.

In embodiments, the method comprises constructing foreground and background constraints for a spine digit based on the localizing step.

In embodiments, the anatomical structure is a rib. And the method comprises constructing hard constraints for each rib.

In embodiments, the method comprises constructing foreground and background constraints for the rib based on the rib centerline.

In embodiments, the identifying is performed by a computer and based on an annotated exemplary anatomical structure.

In embodiments, a non-transient computer readable medium containing program instructions for causing a computer to perform the method of: detecting a spine centerline and spinal canal centerline from a 3D image data set of the patient and wherein the detecting is based on a prediction map; localizing the vertebra center based on the detecting step; and segmenting at least one spine digit based on the localizing step.

In embodiments, the step localizing can further comprise localizing an intervertebral disc center.

In embodiments, the instructions can further include instructions for estimating an augmented spine constrained region, and wherein the localizing step is based on the augmented spine constrained region.

In embodiments, the instructions can further include constructing hard constraints for a spine digit based on the vertebra center and the disc center; and segmenting the spine digit based on the hard constraints.

Benefits of the subject invention include: increasing the speed, reducing the search space, and boosting the performance of detection.

The description, objects and advantages of the present invention will become apparent from the detailed description to follow, together with the accompanying drawings.

BRIEF DESCRIPTION OF THE DRAWINGS

FIGS. 5a-5d are sagittal views of various spine segmentation results; and

FIGS. 6a-6d are 3D visualizations of the spine segmentation results shown in FIGS. 5a-5d, respectively.

DETAILED DESCRIPTION OF THE INVENTION

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail).

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Last, it is to be appreciated that unless defined otherwise, all technical and scientific terms used herein have the same meaning as commonly understood by one of ordinary skill in the art to which this invention belongs.

Overview

Figure 1A:
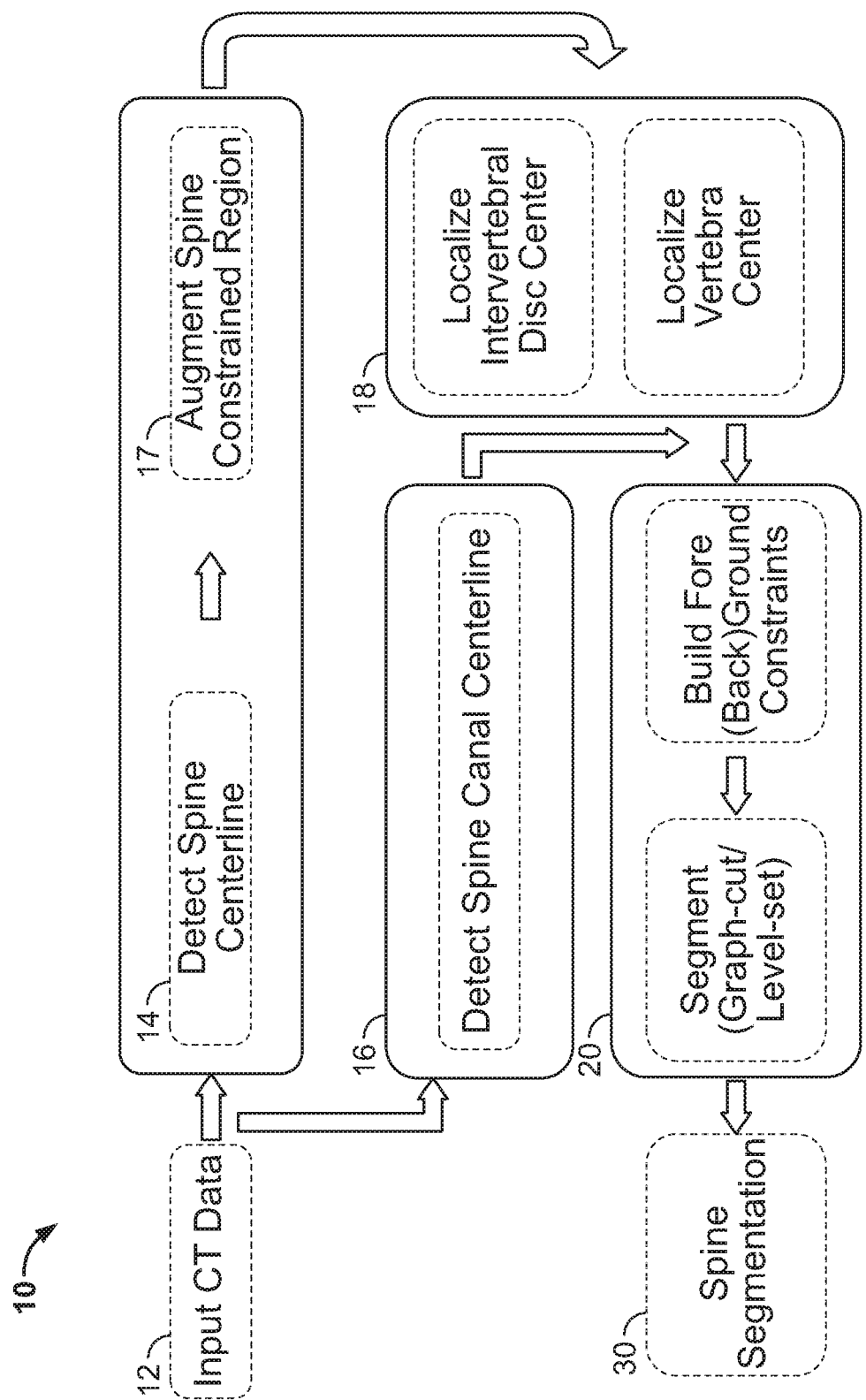
FIG. 1a illustrates an overview of a spine segmentation framework.

FIG. 1a illustrates an overview of a spine segmentation framework 10.

Block 12 shows input CT data such as 3D CT image data of a patient.

Block 14 states to detect the spine centerline. Additionally, in embodiments, an augmented spine constrained region 17 is estimated based on the spine centerline result.

Block 16 states to detect the spine canal centerline.

Block 18 states to localize the vertebra center and intervertebral disc center. As discussed further herein, the localization step 18 may be estimated by probabilistic inference.

Block 20 states to construct or build foreground and background constraints. As discussed further herein, in embodiments, this step may include constructing case-specific foreground and background constraints for each vertebra digit in the segmentation framework. Each vertebra digit may be segmented based on the constraints.

Block 30 is the spine segmentation result. The spine segmentation 30 includes, as discussed further herein, an accurate segmentation of a combination or plurality of vertebrae. In embodiments, the entire spine is segmented.

Figure 1B:
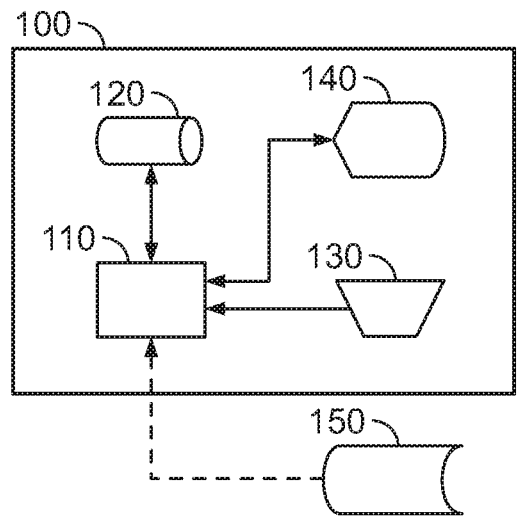
FIG. 1b is a block diagram of a spine segmentation system.

FIG. 1b illustrates a spine segmentation system 100. The system 100 shown in FIG. 1b includes a processor 110 operable to segment the spine based on various data and information as will be described in more detail below.

System 100 is shown having a memory device 120 which receives, holds or stores various information including, for example, 3D CT imaging data. In embodiments, 3D CT image data is in DICOM format.

The system 100 shown in FIG. 1b includes a user input device 130 such as, for example, a keyboard, joystick, or mouse. The user input device allows a user such as the physician to add or input data and information as well as modify the result and to make notes in the files and records.

In embodiments, the physician may make annotations to the data such as, as described further herein, identify anatomical features and components of the spine model.

The system 100 shown in FIG. 1b also includes a display 140 which may present reports, data, images, results and models in various formats including without limitation 3D visualizations and standard medical imaging views.

It is to be understood, however, that although the system in FIG. 1b is shown with a memory 120 for receiving and storing various information the invention is not so limited. In an alternative embodiment the system may be configured to merely access a memory device such as a USB stick, a CD, drive, or other media storage device.

In another embodiment the processor is connectable to a memory device 150 through the internet or through another communication line to access a network. For example, patient data CT scans may be stored on a server of a hospital and the processor of the instant application is adapted to access such data via a communication line and process the data.

Displays may be incorporated with the processor in an integrated system or the displays may cooperate with the processor from a remote location. A processor may be adapted to send or deliver data across a network to one or more displays or portable computer devices, tablets, or smart phones such as the Iphone® manufactured by Apple, Inc. Cupertino, Calif., United States. Indeed, although the computer system shown in FIG. 1b includes a number of various components incorporated into a system, the invention is not so limited. The invention is intended to be limited only as defined in the appended claims.

Figure 1C:
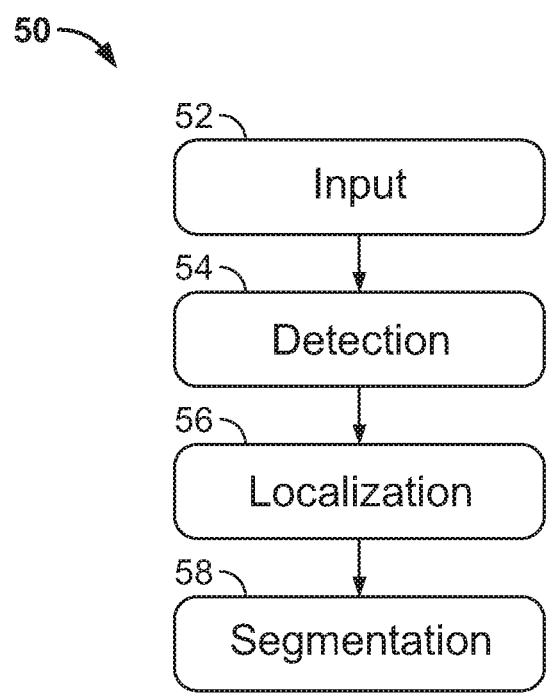
FIG. 1c is a flow diagram of a spine segmentation method.

Now with reference to FIG. 1c, an overview of a method for segmenting the spine is described. Spine segmentation method 50 includes: detection of anatomical features 54 (e.g., detecting and extracting the spine centerline and spine canal centerline); localization 56 (e.g., localization of the vertebra and disc centers); and segmentation 58 (e.g., segmentation of each spine digit based on the spine vertebra localization results). Input 52 includes volumetric image data of the patient such as 3D CT data.

Centerline Detection

In embodiments, the step of detection includes extracting the spine centerline and spine canal centerline.

Spine centerline extraction uses machine learning algorithms to compute a probabilistic map. In embodiments, as described in more detail herein, a voxel-wise learned classifier is applied. Physicians or experts annotate the spine centerline of samples.

Next, and given the annotation of the spine centerline by the physicians or expert, all the voxels on the spine centerline are treated as positive (spine centerline) samples. Other voxels are negative samples in the training. For an unknown volume I, the learned classifier assigns each voxel x a prediction value $p(c(x))$ which represents the likelihood of voxel x being on centerline. A prediction map may be denoted as $P_c$.

Figure 2A:
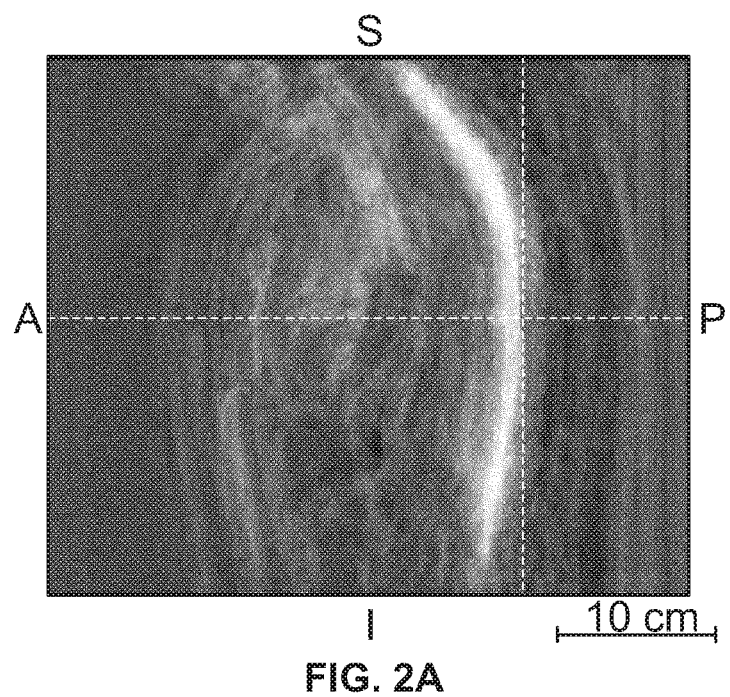
FIGS. 2a and 2b illustrate the detected spine centerline in the form of a probability map in the sagittal view and 3D view, respectively.
Figure 2B:
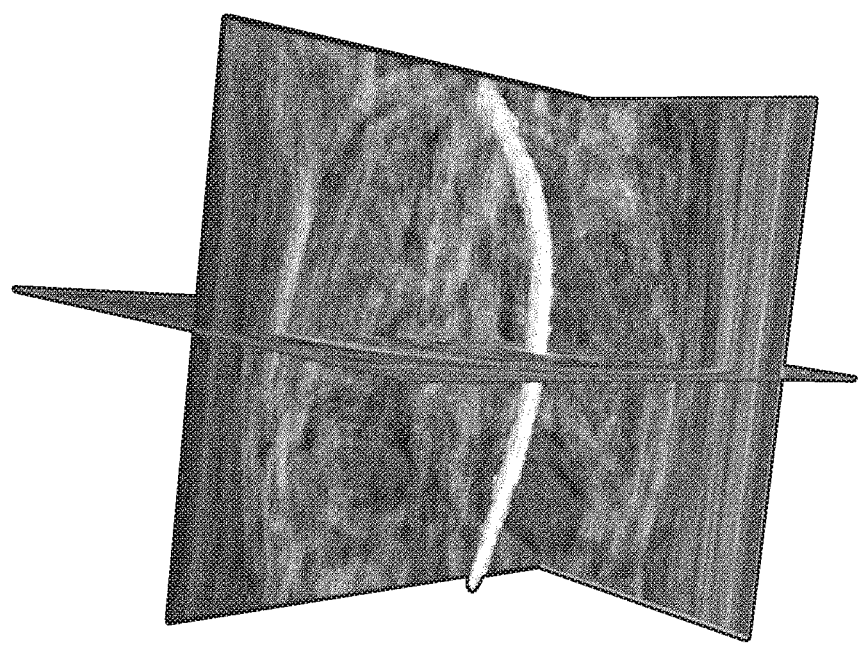

FIGS. 2a-2b show the prediction results of an unknown volume. In particular, FIGS. 2a-2b show results of spine centerline detection by a machine learning algorithm in the form of a probability map or a prediction map. FIGS. 2a-2b show the prediction results in a sagittal view and a 3D visualization view, respectively. Voxels with prediction value $(p(c(x))>0.5)$ are highlighted as brighter (white). In other embodiments, voxels with prediction values greater than a user defined threshold value (e.g., >5, 10, etc.) may be highlighted as brighter (white).

An aim of the spine centerline extraction is to find the path which has the maximum prediction values. By reversing the prediction result, the problem may be solved using generalized shortest path. The reversed probability map is written as $P^\wedge_c$.

To compute the shortest path, the length of a discrete path is defined:

$$L(\Gamma) = \Sigma_{i=1}^{n-1} \sqrt{d_g(x_i, x_{i+1})} \quad (2)$$

where $\Gamma$ is an arbitrary discrete path with n voxels given by a set of voxels $\{x_1, \ldots, x_n\}$. The shortest distance between voxels $x_a$ and $x_b$ is then written as:

$$\Gamma_{a,b} = \underset{\Gamma \in P_{a,b}}{\operatorname{argmin}} L(\Gamma), \quad (3)$$

where $P_{a,b}$ represents the set of all discrete paths between these two voxels.

The key ingredient of the generalized shortest path is the distance $d_g(x_p,x_q)$ between voxels $x_p$ and $x_q$:

$$d_g(x_p,x_q)=\alpha\|\nabla P\hat{}_c(x_p,x_q)\|^2+\beta\|P\hat{}_c(x_p,x_q)\|^2+\gamma\|d_e(x_p,x_q)\|^2. \quad (4)$$

In Eqn. 4, the first term $\nabla P\hat{}_c(x_p,x_q)$ is a finite difference approximation of the gradient on $P\hat{}_c$ between the voxels $(x_p,x_q)$; $P\hat{}_c(x_p,x_q)$ is the average responses on $P\hat{}_c$ between $(x_p,x_q)$; and $d_e(x_p,x_q)$ denotes the Euclidean distance between these two voxels. Parameters $(\alpha,\beta,\gamma)$ are applied to balance these three terms.

To find the generalized shortest path on $P\hat{}_c$, a source voxel and a sink voxel is specified. In embodiments, a strategy automatically computes these terminals. The strategy takes all the voxels S at z=−1 plane as seed points. Then, a multiple source shortest path algorithm is conducted from S along z direction. The multiple source shortest path algorithm stops when a visiting voxel x*'s neighbor is out of the image. x* is treated as sink $x_t$. Finally, the source $x_s$ is identified by tracing back from x*. An example of a shortest path algorithm is described Skiena [Reference 9].

The spine canal centerline may be extracted similar to the spine centerline extraction.

Center Localization

Figure 3A:
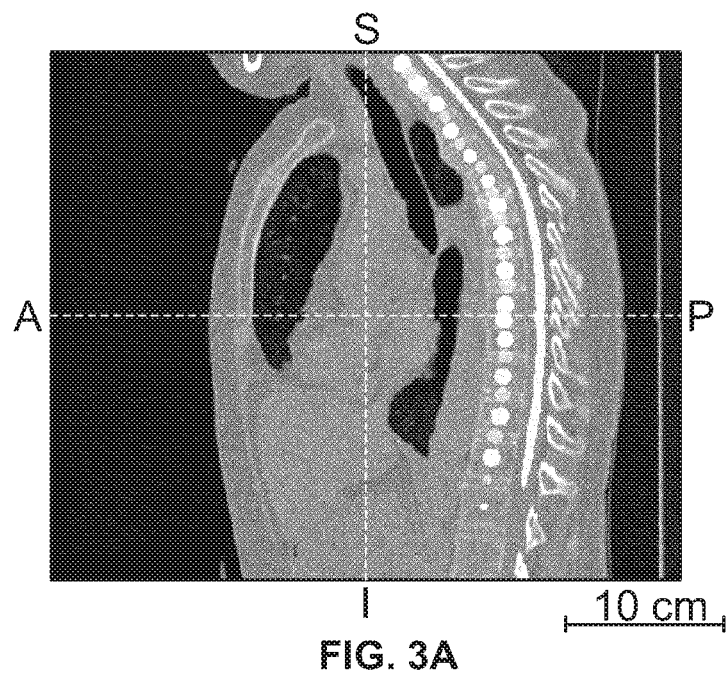
FIG. 3a illustrates a spine vertebra model on the sagittal plane of a CT image.
Figure 3B:
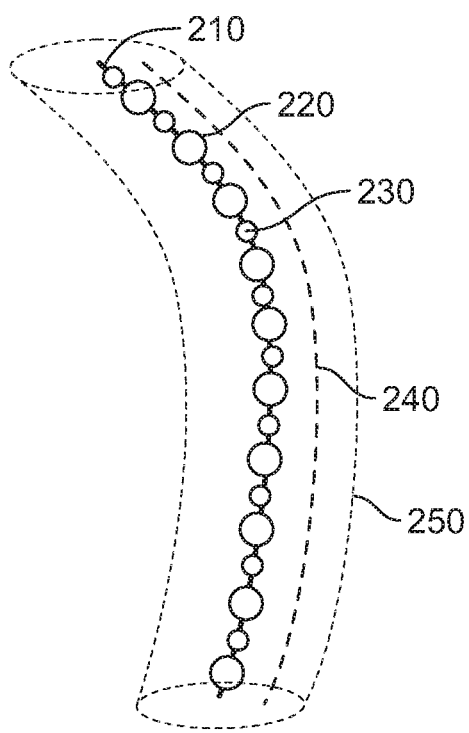
FIG. 3b is an illustration of a spine vertebra model which includes a spine centerline, vertebra centers, intervertebral disc centers, spine canal centerline and the augmented spine constrained region.

FIGS. 3a-3b illustrate components of a spine vertebra model. The model comprises a spine centerline 210, vertebra centers 220, intervertebral disc centers 230, and spine canal centerline 240. The spine vertebra localization described herein finds each component in the spine vertebra model. For each component, and given the manual annotations by the physician mentioned above, a voxel-wise classifier is learned by a supervised machine learning algorithm. For example the following algorithms may be used: Boosting algorithm (as described in Reference 12, 13), Random forest (as described Breiman, Leo, Random forests, Mach. Learn. 45(1), 5-32 (2001)), and support vector machine (SVM) (as described in Boser, Bernhard E., Isabelle M. GUYON, and Vladimir N. VAPNIK, 1992. A training algorithm for optimal margin classifiers. In: COLT '92: Proceedings of the Fifth Annual Workshop on Computational Learning Theory. New York, N.Y., USA: ACM Press, pp. 144-152).

In embodiments of the subject invention, the spine centerline is used to assist in determining the vertebra center localization. In embodiments, a constraint is that the vertebra center is on the spine centerline and vertebra digit center detection is a probabilistic inference problem.

Mathematically, given an unknown 3D volumetric CT image I, our goal is to localize the vertebra centers. Let v(x) be one vertebra center, where x=(x,y,z) is the 3D coordinate in image I. The localization task is to find a set of vertebra centers $V=\{v_k(x)|k=1\ldots N_v\}$ which are present in the image I. The spine centerline is denoted as $C=\{c_i(x)|i=1\ldots N_c\}$, where $c_i(x)$ is one spine centerline point located at x in image I.

The probability of voxel x being vertebra center is defined by:

$$p(v(x))=p(v(x),c(x))=p(v(x)|c(x))p(c(x)), \quad (1)$$

where p(c(x)) is the probability of voxel x being on centerline and p(v(x)|c(x)) is the conditional probability of being vertebra center given p(c(x)).

The vertebra center is determined by an iterative hierarchical searching. Specifically, the spine centerline is first extracted as described above. An augmented spine constrained space is created. The constrained space is used for searching for the vertebra centers.

An example of the constrained searching space is the augmented spine constrained region 250 shown in FIG. 3b.

Vertebra centers are localized in the constrained search region 250. The proposed probabilistic inference algorithm reduces the searching space and also boosts the performance of vertebra center localization.

With reference to Eqn. 1, the vertebra center localization is formalized in a probability inference framework. An augmented spine constrained region $R_{cst}$ is created near spine centerline. A voxelwise vertebra center classifier is also trained from manual annotations. The classifier predicts each voxel $x \in R_{cst}$ a probability p(v(x)) it being vertebra center.

The vertebra centers may be estimated using a mean shift algorithm such as that described in, for example, [References 1 and 10]. Seed points are limited to the spine centerline. In embodiments, for a seed point x, the vertebra center is estimated by:

$$m(x)=\frac{\sum_{x_i \in S} K(x_i-x)p(v(x_i))x}{\sum_{x_i \in S} K(x_i-x)p(v(x_i))}, \quad (5)$$

where Gaussian kernel K parameterized with $\sigma_v$ and $x_i \in S$ are local neighbors of x.

A number of benefits and advantages arise from the subject invention. The seed points of the subject invention are more reliable than that described in Glocker et al [Reference 1] where the seed points are randomly initialized. Additionally, the use of the probabilistic inference boosts the localization performance. Yet another benefit is that a complex false positive removal strategy is not required. Instead, in embodiments of the subject invention, use of a threshold removes the false positives. The threshold may be based on average response of m(x) within $\sigma_v$.

Localization of the intervertebral disc center 230 is carried out in a similar manner to the algorithm used to localize the vertebrae center 220.

In other embodiments, localization of the anatomic structure is carried out by other techniques including, for example, bounding box localization. An example of bounding box localization is described in Criminisi et al. [Reference 14].

Digit Segmentation

In embodiments, the step of spine segmentation comprises constructing case-specific foreground and background constraints based on the results of spine vertebra localization. By "case-specific", it is meant that the foreground/background constraints are constructed for each individual spine digit.

Constraints include spine centerline and spine canal centerline. The location of the candidate vertebra is limited to a tube-like region. The tube-like region also roughly limits the size of vertebra. The detected vertebra center and intervertebral disc centers also serve as foreground and background hard constraints for spine segmentation.

Figure 4A:
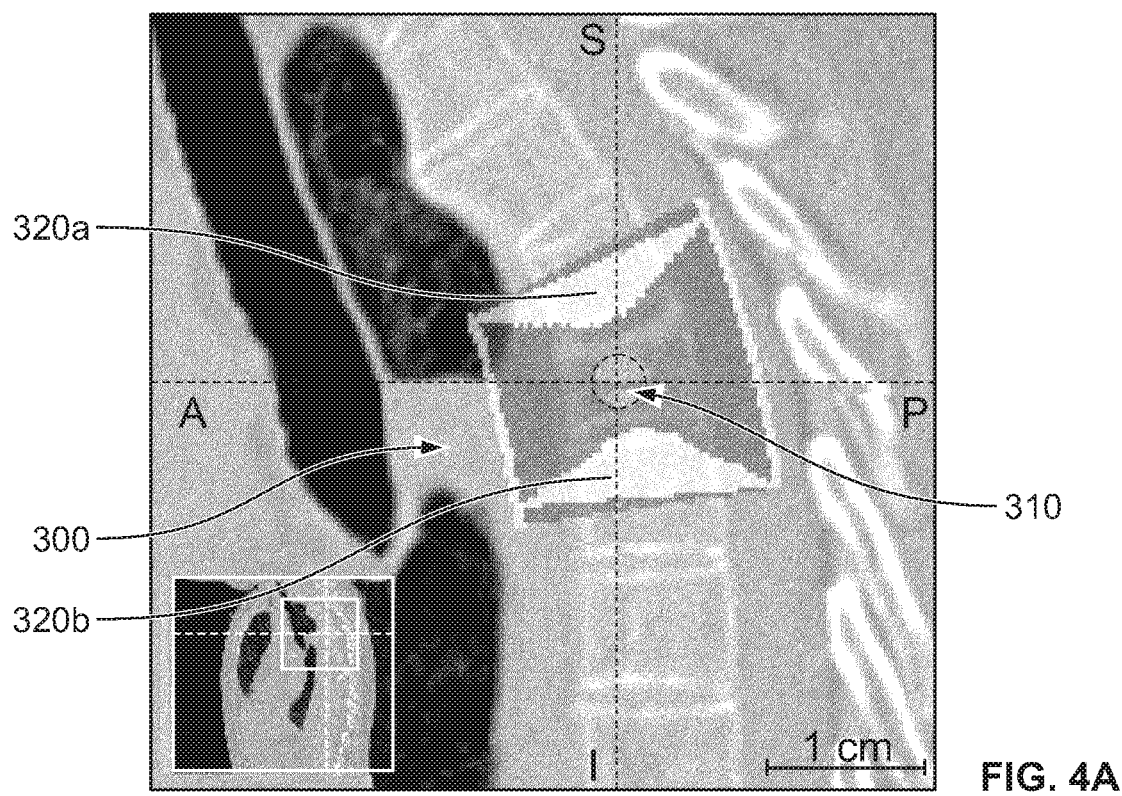
FIG. 4a illustrates foreground and background constraints of one spine digit in the sagittal view.

FIG. 4a provides an example of the above mentioned hard constraints for one digit. For each vertebra digit, a tube-like region 300 is constructed by the spine centerline and canal centerline. Foreground (310) are voxels near the estimated vertebra center. Two cone-like background regions (320a,b) are created from its adjacent vertebra centers and intervertebral disc centers. Other voxels within the tube-like region are unknown.

Figure 4B:
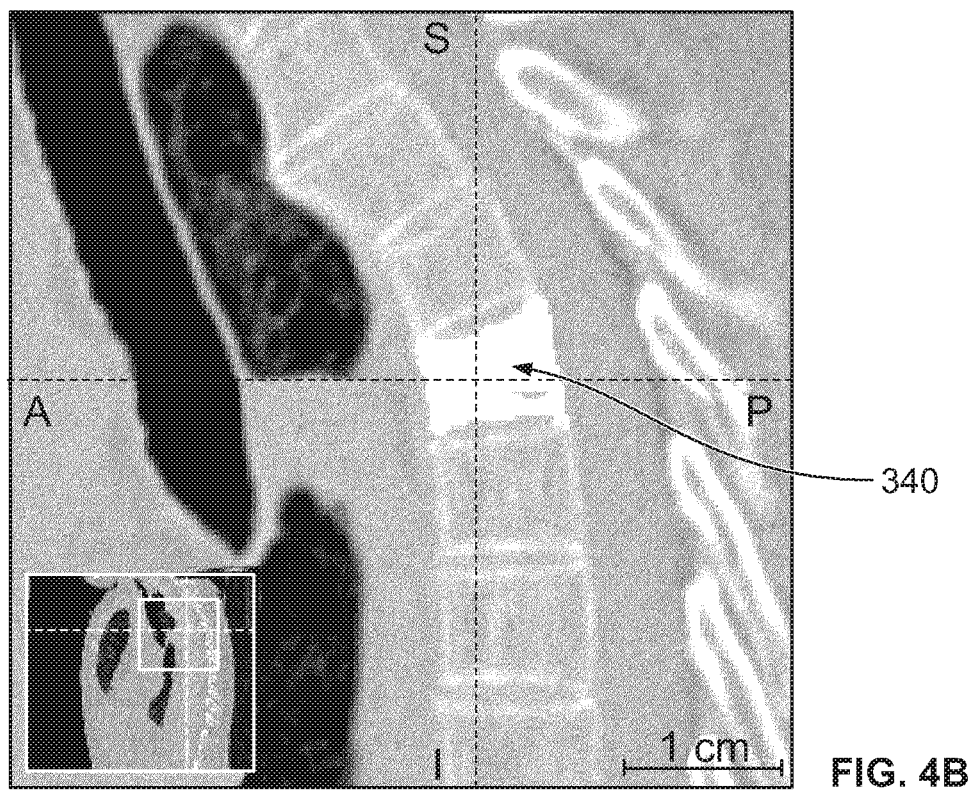
FIG. 4b illustrates the segmentation of the spine digit shown in FIG. 4a, and shown in the sagittal view.

FIG. 4 (b) is the corresponding segmentation of the vertebra digit 340 shown in FIG. 4a, shown in the sagittal view.

Note that compared to [Reference 1], where seed points are randomly initialized, the seed points of the subject invention are more reliable. Also, the probabilistic inference can boost the localization performance. Another benefit is that the subject methods do not require complex false positive removal strategy. A simple threshold is sufficient to remove the false positives. The threshold is based on average response of m(x) within $\sigma_v$.

The proposed hard constraints can be applied to segmentation framework using a wide variety of techniques including, e.g., graph-cut and level-set as described in references 3 and 11, respectively. In an example described herein, a graph-cut algorithm is applied to demonstrate the effectiveness of the proposed foreground and background constraints.

The set of voxel-labeling is denoted by $f=\{f_1, \ldots, f_N\}$. Each label $f_i$ of foreground or background for voxel $x_i$ is written as $f_i \in \{0,1\}$. By having sufficient hard constraints, the Graph-cut is simplified to only rely on pair-wise interaction. The energy function of the segmentation can then expressed by:

$$E(f) = \sum_{\{x_p, x\_q\} \in N} V(f_p, f_q) = \sum_{\{x_p, x\_q\} \in N} \exp\left(\frac{\|I(x_p) - I(x\_q)\|^2}{2\sigma^2}\right) \frac{\partial(f_p \neq f_q)}{d_e(x_p, x_q)} \quad (6)$$

where $V(f_p, f_q)$ represents the penalty for the discontinuity of labels between voxels $x_p$ and $x_q$. $d_e(x_p, x_q)$ denotes the Euclidean distance between these two voxels. $\delta(\bullet)$ is an indicator function.

Unlike in Kelm et al. [Reference 2], the hard constraints and simplified energy minimization of the subject invention aid in avoiding over-segmentation of the spine canal and adjacent vertebra.

Example

The method described herein was tested on a dataset that included 10 volumetric CT data for lung cancer procedure.

The CT size is about 512×512×450 voxels. The resolution of the data is around 0.8 mm×0.8 mm×0.8 mm.

For each data, experts manually annotated the spine centerline, canal centerline, vertebra centers and intervertebral disc centers.

A 5-fold cross-validation was applied in the experiments. In each cross validation, 8 data volumes were used for training and the other 2 data volumes were used for testing.

A voxel-wise classifier was trained for each component of the spine vertebra model. We used a machine learning (e.g., boosting trees algorithm) and a box-like feature (e.g., 3D Haar feature) to capture local contrast. In this example, we used a boosting tree (namely, Adaboost) as described in References 12 and 13.

In the experiment, given the spine centerline $C=\{c_i(x) | i = 1 \ldots N_c\}$, the spine centerline classifier was trained by positive training samples $x^p$ and negative training samples $x^n$:

$$\|x^p - x_c\|^2 \leq \tau_p, \|x^n - x_c\|^2 > \tau_n \quad (7)$$

where $x_c \in C$ be an annotated location of spine centerline. Parameters $\tau_p = 3$ and $\tau_n = 6$ (in mm) are used to control the training samples generation.

Training samples of vertebra centers and intervertebral disc centers were extracted from constrained space $R_{cst}$.

The localization error (in mm) of vertebra center and intervertebral disc center were used to evaluate the method. The statistical results are listed in Table 1, shown below. The average localization error for both vertebra center and intervertebral disc center are about 1.6 mm.

TABLE 1

Localization error of vertebra center and intervertebral disc center

| cv-i indicates experimental result for fold-i of cross-validation. | vertebra center (mm) | intervertebral disc center (mm) |
| --- | --- | --- |
| cv-1 | 1.5215 ± 0.7241 | 1.6769 ± 0.8669 |
| cv-2 | 1.2648 ± 0.5806 | 1.4457 ± 0.5977 |
| cv-3 | 1.3815 ± 0.6231 | 1.5320 ± 0.7384 |
| cv-4 | 1.5219 ± 0.8554 | 1.4587 ± 0.5290 |
| cv-5 | 2.3360 ± 1.0355 | 2.1996 ± 1.0674 |
| average | 1.6017 ± 0.8576 | 1.6580 ± 0.8192 |

Segmentation was performed with a 26-neighbor for the pair-wise energy in Eqn. 6, shown above. $\sigma=10$ is set for all the volumes. In the experiment, segmentation was achieved for each of the annotated vertebra.

The segmentation results are shown in FIGS. 5-6. FIGS. 5a-5d are sagittal views of various spine segmentation results. FIGS. 6a-6d are 3D visualizations of the spine segmentation results shown in FIGS. 5a-5d, respectively. The experimental results demonstrate the above described method is effective for a complete spine localization and segmentation.

Applications

Described herein is a novel system and method for spine segmentation. Spine segmentation has a wide range of applications including without limitation screening and diagnosis for suspect tissues, treatment planning, and therapies such as excision or ablation of tumors.

It will be understood that some variations and modifications can be made to that described herein without departure from the spirit and scope of the present invention as recited in the appended claims. Such modifications and variations are intended to be within the scope of the appended claims.

REFERENCES

[1] Ben Glocker, Darko Zikic, Ender Konukoglu, David R Haynor, and Antonio Criminisi, "Vertebrae localization in pathological spine ct via dense classification from sparse annotations," in *MICCAI*, pp. 262-270. Springer, 2013.

[2] B Michael Kelm, Michael Wels, S Kevin Zhou, Sascha Seifert, Michael Suehling, Yefeng Zheng, and Dorin Comaniciu, "Spine detection in ct and mr using iterated marginal space learning," *Medical image analysis, vol. 17, no. 8*, pp. 1283-1292, 2013.

[3] Yuri Y Boykov and Marie-Pierre Jolly, "Interactive graph cuts for optimal boundary & region segmentation of objects in nd images," in *ICCV. IEEE*, 2001, vol. 1, pp. 105-112.

[4] Asem M Ali, Melih S Aslan, and Aly A Farag, "Vertebral body segmentation with prior shape constraints for accurate bmd measurements," *Computerized Medical Imaging and Graphics, vol. 38, no. 7*, pp. 586-595, 2014.

[5] Melih S Aslan, Asem Ali, Dongqing Chen, Burr Arnold, Aly Farag, Ping Xiang, et al., "3d vertebrae segmentation using graph cuts with shape prior constraints," in *ICIP. IEEE*, 2010, pp. 2193-2196.

[6] Jun Ma and Le Lu, "Hierarchical segmentation and identification of thoracic vertebra using learning-based edge detection and coarse-to-fine deformable model," *Computer Vision and Image Understanding*, vol. 117, no. 9, pp. 1072-1083, 2013.
[7] Abtin Rasoulian, Robert Rohling, and Purang Abolmaesumi, "Lumbar spine segmentation using a statistical multi-vertebrae anatomical shape+ pose model," *TMI*, vol. 32, no. 10, pp. 1890-1900, 2013.
[8] Qian Wang, Le Lu, Dijia Wu, Noha El-Zehiry, Dinggang Shen, and Kevin S Zhou, "Automatic and reliable segmentation of spinal canals in low-resolution, low-contrast ct images," in *Computational Methods and Clinical Applications for Spine Imaging*, pp. 15-24. Springer, 2014.
[9] S Skiena, "Dijkstra's algorithm," Implementing Discrete Mathematics: Combinatorics and Graph Theory with Mathematica, Reading, Mass.: Addison-Wesley, pp. 225-227, 1990.
[10] Yizong Cheng, "Mean shift, mode seeking, and clustering," *TPAMI*, vol. 17, no. 8, pp. 790-799, 1995.
[11] Ravikanth Malladi, James Sethian, Baba C Vemuri, et al., "Shape modeling with front propagation: A level set approach," *Pattern Analysis and Machine Intelligence, IEEE Transactions on*, vol. 17, no. 2, pp. 158-175, 1995.
[12] Yoav Freund and Robert E Schapire, "A desiciontheoretic generalization of on-line learning and an application to boosting," in *Computational learning theory*. Springer, 1995, pp. 23-37.
[13] Jerome Friedman, Trevor Hastie, Robert Tibshirani, et al., "Additive logistic regression: a statistical view of boosting," *The annals of statistics*, vol. 28, no. 2, pp. 337-407, 2000.
[14] Criminisi, Antonio, Jamie Shotton, Duncan Robertson, and Ender Konukoglu. "Regression forests for efficient anatomy detection and localization in CT studies." In Medical Computer Vision. Recognition Techniques and Applications in Medical Imaging, pp. 106-117. Springer Berlin Heidelberg, 2011.

We claim:

1. A method for identifying an anatomic structure of a patient comprising:
 receiving a 3D image data set of the patient;
 detecting a spine centerline and a spine canal centerline of the anatomic structure from the 3D image data set of the patient wherein the detecting is based on a prediction map, and wherein the anatomic structure is the spine and comprises a plurality of interconnected spine digits;
 localizing a vertebra center of each of the plurality of interconnected spine digits, wherein each said vertebra center is required to be on the spine centerline;
 constructing hard constraints for each spine digit, wherein the hard constraints include digit-specific background and foreground constraints based on the spine canal centerline, vertebra centers, intervertebral disc centers, and the spine centerline; and
 automatically segmenting the anatomic structure based on the hard constraints from the constructing step; and
 displaying the segmented anatomical structure.

2. The method of claim 1 comprising localizing the intervertebral disc center of each intervertebral disc, wherein each said intervertebral disc center is required to be on the spine centerline.

3. The method of claim 2 wherein the background constraints for each spine digit comprise two cone-like regions.

4. The method of claim 1 wherein the detecting is performed based on optimizing prediction values of the prediction map.

5. The method of claim 4 wherein the optimizing prediction values of the prediction map is based on a shortest path algorithm.

6. The method of claim 1 further comprising computing an augmented constrained region encompassing the anatomic structure, and based on the spine centerline and spine canal centerline arising from the detecting step.

7. The method of claim 1 wherein the localizing step is estimated by a probabilistic inference algorithm.

8. The method of claim 1 wherein the prediction map is based on a machine learning algorithm.

9. The method of claim 1 wherein the anatomic structure is rigid.

10. The method of claim 1 further comprising identifying the anatomical structure and wherein the identifying is performed by a computer and based on an annotated exemplary anatomical structure.

11. A system for segmenting an anatomical structure of a patient, the system comprising:
 a memory unit for storing 3D image data of the patient;
 a programmed processor operable to:
  detect a characteristic feature of the anatomical structure and compute an augmented constrained region encompassing the anatomical structure, and wherein the characteristic feature comprises at least one centerline selected from the group consisting of a spine centerline and a spine canal centerline and the detecting is based on a prediction map;
  localize a vertebra center and an intervertebral disc center based on the augmented constrained region; and
  segment the anatomical structure based on the detected characteristic feature and the augmented constrained region; and
 a display in communication with the processor and for displaying the segmented anatomical structure.

12. The system of claim 11 wherein the programmed processor is operable to construct hard constraints for a spine digit based on each vertebra center and disc center adjacent said spine digit, and to segment the anatomical structure based on the hard constraints.

13. The system of claim 12, wherein the hard constraints comprise background constraints for each spine digit.

14. The system of claim 13, wherein the background constraints comprise two cone-like regions.

15. The system of claim 11 wherein computing the augmented constrained region computes a tube-like region encompassing the spine centerline and spine canal centerline.

16. The system of claim 11 wherein the processor is further operable to identify the anatomical structure based on an annotated exemplary anatomical structure.

17. The system of claim 11 wherein the processor is operable to detect the characteristic feature based on a prediction map, and the prediction map is based on a machine learning algorithm.

* * * * *